(12) United States Patent
Waugh et al.

(10) Patent No.: US 10,891,084 B2
(45) Date of Patent: Jan. 12, 2021

(54) APPARATUS AND METHOD FOR PROVIDING DATA TO A MASTER DEVICE

(71) Applicant: Arm Limited, Cambridge (GB)

(72) Inventors: Alex James Waugh, Cambridge (GB); Geoffray Mattheiu Lacourba, Nice (FR); Andrew John Turner, Cambridge (GB); Sergio Schuler, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/353,257

(22) Filed: Mar. 14, 2019

(65) Prior Publication Data

US 2020/0293233 A1 Sep. 17, 2020

(51) Int. Cl.
| | |
|---|---|
| *G06F 3/06* | (2006.01) |
| *G06F 9/50* | (2006.01) |
| *G06F 13/16* | (2006.01) |
| *G06F 12/0837* | (2016.01) |
| *G06F 9/54* | (2006.01) |

(52) U.S. Cl.
CPC ............ *G06F 3/0685* (2013.01); *G06F 3/064* (2013.01); *G06F 3/0604* (2013.01); *G06F 3/0656* (2013.01); *G06F 9/5016* (2013.01); *G06F 12/0837* (2013.01); *G06F 13/1673* (2013.01); *G06F 9/544* (2013.01)

(58) Field of Classification Search
CPC ..... G06F 13/1673; G06F 3/064; G06F 9/5016
See application file for complete search history.

(56) References Cited

U.S. PATENT DOCUMENTS

| | | | |
|---|---|---|---|
| 2009/0150624 A1* | 6/2009 | Resnick ................ | G06F 9/3834 711/155 |
| 2010/0153659 A1* | 6/2010 | Lovell ................. | G06F 13/1642 711/151 |

\* cited by examiner

*Primary Examiner* — Zachary K Huson
(74) *Attorney, Agent, or Firm* — Nixon & Vanderhye P.C.

(57) ABSTRACT

Aspects of the present disclosure relate to an interconnect comprising an interface to couple to a master device, the interface comprising buffer storage. The interface is configured to receive a request from the master device for data comprising a plurality of data blocks, the master device requiring the data blocks in a defined order. A data collator is configured to: receive the request; issue a data pull request to cause the interface to allocate buffer space in the buffer storage for buffering the requested data; and responsive to receiving a confirmation that the buffer space is allocated, provide the requested data to the buffer storage. The interface is configured to employ the buffer storage to enable re-ordering of the plurality of data blocks of the requested data, prior to outputting the plurality of data blocks to the master device; and output the plurality of data blocks to the master device in the defined order.

17 Claims, 7 Drawing Sheets

US 10,891,084 B2

APPARATUS AND METHOD FOR PROVIDING DATA TO A MASTER DEVICE

BACKGROUND

The present technique relates to the field of processing apparatuses.

Some processing apparatuses include an interconnect for coupling master devices to slave devices. For example, the devices may be functional blocks of a system-on-chip. A master device may issue, to the interconnect, requests for data. For example, the data may be stored in a storage slave device. The provision of such data to the master device, via the interconnect, can present a bottleneck in the processing capabilities of the apparatus.

In some situations, when a master device requests data comprising a plurality of data blocks, the master device may require that those data blocks are provided in a defined order, and the interconnect may in such situations need to provide the ability to buffer data blocks so that they can be provided back to the master device in the required order. As the buffer size is increased, this increases the area requirements of the interconnect, but the potential throughput of data through the interconnect can be limited by the buffer size.

It would therefore be desirable to improve the provision of data to master devices responsive to requests therefrom.

SUMMARY

At least some examples provide an interconnect comprising:

an interface to couple a master device to the interconnect, the interface comprising buffer storage, wherein the interface is configured to receive, from the master device, a request for data comprising a plurality of data blocks, the master device requiring the data blocks of the plurality to be provided in a defined order; and a data collator configured, at least for one operation mode of the interconnect, to:
  receive the request from the interface;
  issue a data pull request to the interface, to cause the interface to allocate buffer space in the buffer storage for buffering the requested data; and
  responsive to receiving a confirmation from the interface that the buffer space is allocated, provide the requested data to the buffer storage,
the interface being configured to:
  employ the buffer storage to enable re-ordering of the plurality of data blocks of the requested data as received by the interface, prior to outputting the plurality of data blocks to the master device; and
  output the plurality of data blocks to the master device in the defined order.

Further examples provide a method comprising:
  receiving, from a master device, a request for data comprising a plurality of data blocks, the master device requiring the data blocks of the plurality to be provided in a defined order;
  transmitting the request to a data collator;
  receiving, from the data collator, a data pull request;
  responsive to the data pull request, allocating buffer space in a buffer storage for buffering the requested data;
  issuing to the data collator a confirmation that the buffer space is allocated;
  receiving, from the data collator, the requested data, and buffering the requested data in the buffer storage, to enable re-ordering of the plurality of data blocks of the requested data as received by the interface; and
  outputting the plurality of data blocks to the master device in the defined order.

Further examples provide an interconnect comprising:
  interface means to couple master device means to the interconnect, the interface means comprising buffer storage means, wherein the interface means is configured to receive, from the master device means, a request for data comprising a plurality of data blocks, the master device means requiring the data blocks of the plurality to be provided in a defined order; and
  data collator means configured, at least for one operation mode of the interconnect, to:
    receive the request from the interface means;
    issue a data pull request to the interface means, to cause the interface means to allocate buffer space in the buffer storage means for buffering the requested data; and
    responsive to receiving a confirmation from the interface that the buffer space is allocated, provide the requested data to the buffer storage means, the interface means being configured to:
    employ the buffer storage means to enable re-ordering of the plurality of data blocks of the requested data as received by the interface means, prior to outputting the plurality of data blocks to the master device means; and
    output the plurality of data blocks to the master device means in the defined order.

Further aspects, features and advantages of the present technique will be apparent from the following description of examples, which is to be read in conjunction with the accompanying drawings.

DESCRIPTION OF EXAMPLES

Figure 1:
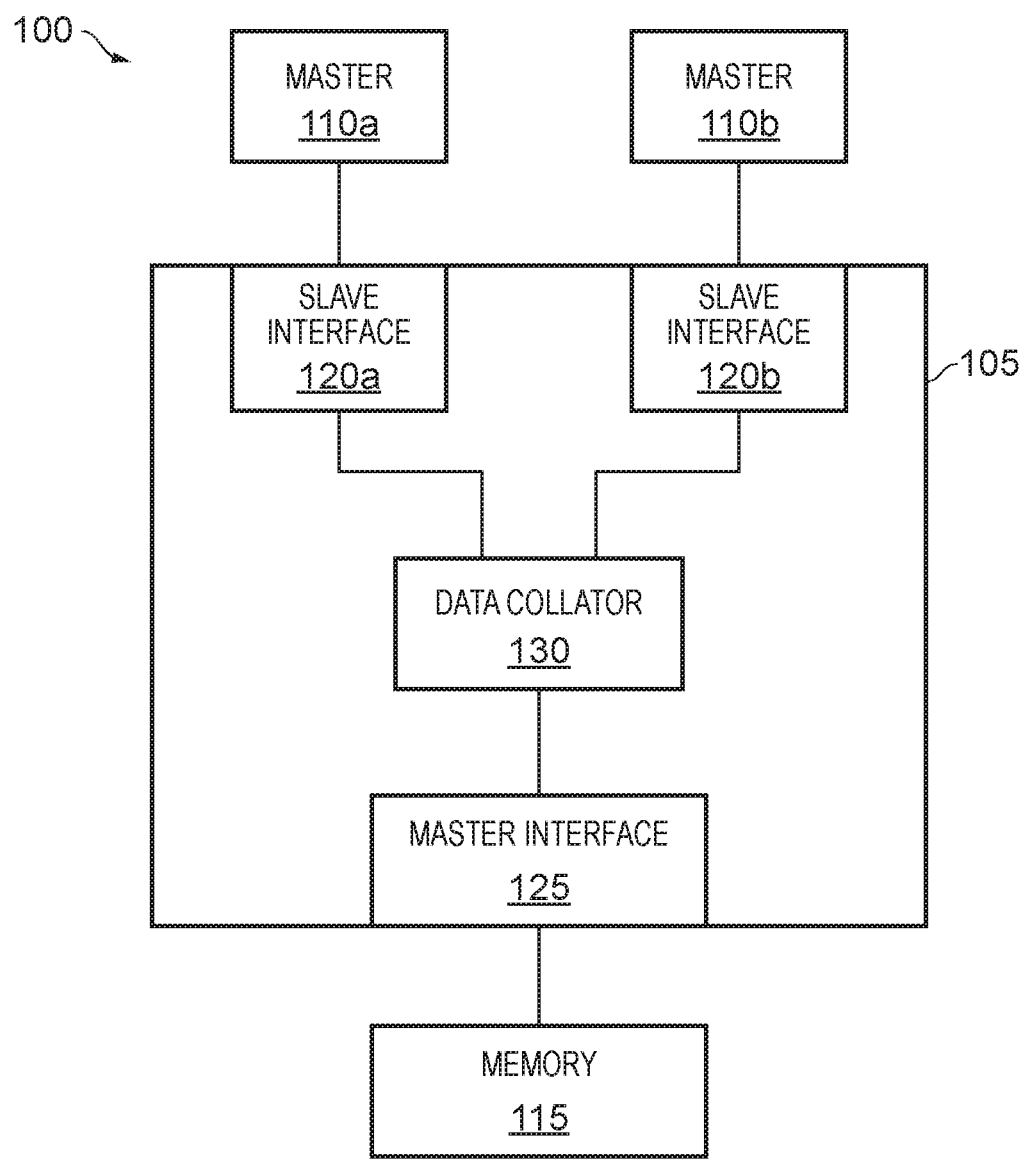
FIG. 1 schematically depicts an apparatus according to examples of the present disclosure.

As described above, an interconnect can be coupled to master devices (each of which may, for example, be a processing device such as a functional block of a system-on-chip). An example interconnect comprises an interface to couple such a master device to the interconnect (further interfaces may be provided to couple to further master devices). The interface comprises buffer storage. The interface is configured to receive, from the master device, a request for data comprising a plurality of data blocks. The master device requires the data blocks of the plurality to be provided in a defined order. For example, the data blocks may comprise data to store in a cache line of a cache of the master device, and the defined order may be such that the data blocks are output to the master device in an order corresponding to their order within the cache line.

The interconnect further comprises a data collator. In at least one operation mode of the interconnect, the data collator is configured to receive the request from the interface and subsequently issue a data pull request to the interface, to cause the interface to allocate buffer space in the buffer storage for buffering the requested data. For example, the data pull request may be delayed until the requested data, or at least some data blocks thereof, have been collated by the data collator. The data collator then, responsive to receiving a confirmation from the interface that the buffer space is allocated, provides the requested data to the buffer storage.

The interface is configured to employ the buffer storage to enable re-ordering of the plurality of data block of the requested data as received by the interface, prior to outputting the plurality of data blocks to the master device. The interface then outputs the plurality of data blocks to the master device in the defined order. The data blocks can thus be delivered to the buffer out-of-order and re-ordered as necessary to provide them to the master device in the defined order.

Allocating the buffer space responsive to the data pull request can reduce the overall time for which the buffer space is allocated, relative to comparative systems in which no data pull request is issued and the buffer space is allocated responsive to receiving the request for data from the master device. For example, in one example implementation in which the data pull request is issued when all the requested data has been collated at the data collator, the buffer space is allocated only for the relatively short amount of time that is required for issuing the confirmation that the buffer space is allocated followed by transmitting the collated data to the buffer, re-ordering if necessary, and outputting the ordered data to the master device. Conversely, in comparative systems in which the buffer space is allocated responsive to receiving the request for data from the master device, the buffer space is allocated additionally whilst the data collator retrieves and collates the data. This retrieval can be an order of magnitude more time consuming (for example several hundred processing cycles if the data is to be retrieved from a memory). This reduction in the time for which buffer space is allocated allows a larger number of data requests to be serviced for a given buffer size or, equivalently, allows a smaller buffer to be used for servicing a given number of data requests. The throughput/bandwidth observed within the interconnect can thereby be improved, and/or a reduction in area requirements for implementing the interconnect can be realised.

In an example, the data collator is a cache to store copies of data items from a memory. The cache may be configured, responsive to a lack of a stored copy of at least part of the requested data, to retrieve said at least part from the memory. Thus, a data request relating entirely to data that is already cached can be serviced efficiently from the cache. In response to a data request that relates, at least in part, to un-cached data, the cache can retrieve the un-cached data from the memory for servicing the request.

The cache may be configured to issue the data pull request responsive to determining a presence of a stored copy of at least part of the requested data. This can improve the speed of servicing the request, as the process of allocating buffer space can be initiated as soon as at least part of the requested data is cached. However, this can increase the length of time for which the buffer is allocated, thereby reducing to some extent the performance advantages discussed above in relation to reducing the time for which the buffer space is allocated.

Alternatively, the cache may be configured to issue the data pull request responsive to determining a presence of a stored copy of all of the requested data. This can reduce the speed of servicing the request, because no data will be provided to the buffer until all the data is cached. However, this minimises the length of time for which the buffer space is allocated and thereby maximises the above-described performance advantages associated with reducing the time for which the buffer space is allocated.

In some examples, the interconnect is configured to switch from a first operation mode in which the interface is configured to allocate the buffer space responsive to receiving the request, to a second operation mode (which is one of the at least one operation modes mentioned earlier), in which the interface is configured to allocate the buffer space responsive to receiving the data pull request. In other words, the interconnect is configured to switch between the functionality described above, and the functionality associated with the above-described comparative system. The switching from the first operation mode to the second operation mode may be made responsive to a mode switch condition being met. The interconnect may further be configured to switch from the second operation mode back to the first operation mode responsive to a determination that the mode switch condition is not met.

The advantages of the second mode of operation are described above. However, the latency associated with servicing a request for data in this mode of operation is increased relative to the first mode of operation, as a consequence of the data pull request and the confirmation: two transmissions are performed, which are not performed in the first mode of operation. Switching between these operation modes dynamically therefore allows the interconnect to operate in the most appropriate operation mode at a given time, as described in more detail below.

In one such example, the mode switch condition is that an allocated amount of the buffer storage exceeds a threshold. The interconnect can thus use the (lower-latency) first mode until the buffer becomes relatively full, and then switch to the (higher-latency but more efficient in terms of buffer usage) second mode.

In another such example, wherein the data collator is a cache to store copies of data items from a memory, the mode switch condition may be a condition indicating that a hit rate of requested data in the cache has fallen below a threshold. If the hit rate in the cache is relatively high, the latency associated with servicing requests for data is relatively low, as a relatively large proportion of requested data can be provided directly from the cache without performing the more time-consuming process of retrieving the data from the memory. In such operating conditions, buffer space is generally allocated for a relatively short amount of time even when operating in the first mode, because the time between receiving a request for data and servicing that request from the cache is relatively short. The interconnect can thus operate efficiently in the first mode. Conversely, if the hit rate is relatively low, the latency associated with servicing requests for data is relatively high because a relatively large proportion of data must be retrieved from memory before it can be provided to the buffer. If the first operating mode were used, given buffer space would therefore be allocated for a relatively large time. In such operating conditions, the interconnect can operate more efficiently in the second mode.

In one example implementation, the interface is configured to determine when at least one of the plurality of data blocks as received by the interface is already in the defined order. The interface can then bypass the buffer to output said at least one of the plurality of data blocks to the master device. The interface can be configured to provide data blocks, other than said at least one of the plurality of data blocks, to the buffer storage to enable said re-ordering. This can improve efficiency, by only using the buffer for data that is to be re-ordered before being provided to the master device. In this example, it is not relevant to the functioning of the master device whether a given received data block is received from the buffer or not, provided that the data blocks are received in the correct order.

As noted above, further interfaces may be provided to couple further master devices to the interconnect. The data collator may be configured to service requests from each such further master device.

Further examples will now be described with reference to the Figures.

FIG. 1 schematically depicts an apparatus 100 according to examples of the present disclosure. The apparatus may for example be implemented as a system-on-chip.

The apparatus 100 comprises two master devices 110a, 110b, which may for example be processing cores, and a memory 115. In other examples, the apparatus may comprise only a single master device, or may comprise more than two master devices. The master devices 110a, 110b and the memory 115 are connected via an interconnect 105. The memory can be considered a slave device, and in some implementations additional slave devices may also be coupled to the interconnect. The interconnect provides for data transmission between the master devices 110a, 110b and the memory 115, such that the master devices 110a, 110b can retrieve data from the memory 115 and store data in the memory 115.

The interconnect 105 includes slave interfaces 120a, 120b via which the master devices 110, 11b are coupled to the interconnect 105. Each slave interface 120a, 120b includes a buffer storage for buffering data that is to be transmitted to the corresponding master device 110a, 110b. The interconnect 105 further includes a master interface 125 via which the memory 115 is coupled to the interconnect.

The slave interfaces 120a, 120b can take a variety of forms, but in one example implementation may be Accelerator Coherency Ports (ACPs) operating according to the ACE-Lite protocol developed by Arm Limited, Cambridge, United Kingdom.

The interconnect 105 includes a data collator 130, which may for example be a cache as described in more detail below. The data collator 130 is configured to receive from each slave interface 120a, 120b data requests originating from the corresponding master device 110a, 110b. The data requests relate to data blocks stored in the memory 115. In response to receiving such a data request, the data collator 130 collates the requested data (retrieving some or all of the requested data from the memory 115, via the master interface 125, if necessary, for example is that data is not already cached within the data collator 130) and issues a data pull request to the slave interface 120a, 120b associated with the master device 110a, 110b that requested the data. The data pull request causes that slave interface 120a, 120b to allocate buffer space in its buffer storage for buffering the requested data.

When the buffer space is allocated, a confirmation is provided to the data collator 130. The data collator 130 then provides the requested data to the buffer storage. The buffer storage can be employed to re-order the requested data blocks into the order in which they are required by the master device 110a, 110b. The data blocks are then output, in this order, to the master device 110a, 110b.

The apparatus thereby allows a reduction in the time for which the buffer space is allocated, relative to comparative systems in which buffer space is allocated as soon as a data request is received by one of the slave interfaces 120a, 120b.

Figure 2:
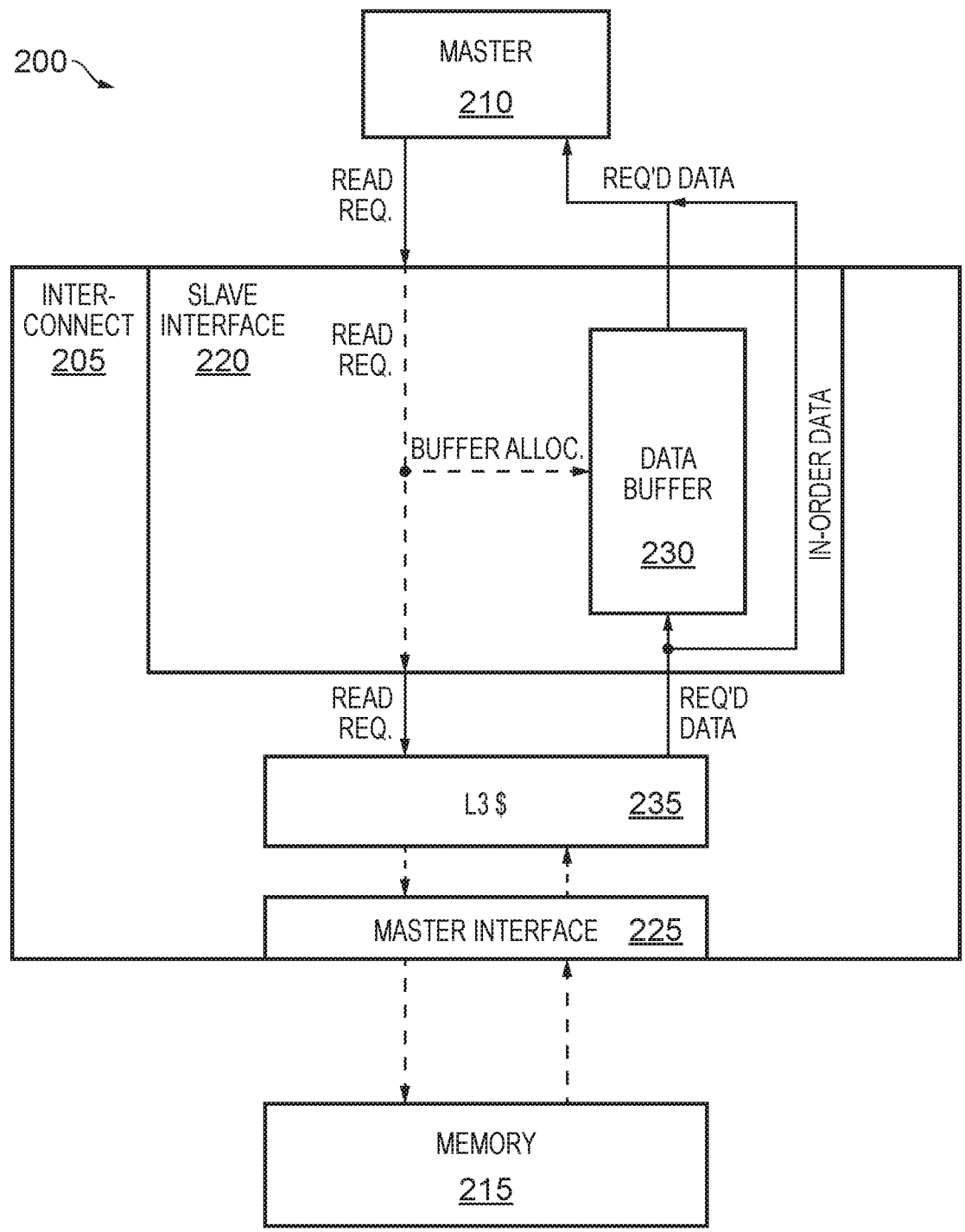
FIG. 2 schematically depicts operational flow within an apparatus according to a comparative example.

FIG. 2 schematically depicts operational flow within an apparatus 200 according to a comparative example.

The apparatus comprises an interconnect 205 via which a master device 210 interacts with a memory 215, as set out above in relation to FIG. 1. As with the apparatus 100, the interconnect 205 includes a slave interface 220 coupled to the master device 210 and a master interface 225 coupled to the memory 215. The slave interface comprises a data buffer 230 for buffering data that is to be provided to the master device 210.

The interconnect 205 comprises a level 3 (L3) cache 235. The L3 cache 235 stores copies of data items from the memory 215 for access by the master device 210. The latency associated with accesses to the L3 cache 235 is lower than the latency associated with accesses to the memory 215. For completeness it is assumed in this example that the master device 210 itself includes an L2 cache and an L1 cache (not shown in FIG. 2); the latency associated with accesses to these caches is lower than the latency associated with accesses to the L3 cache 235. In some examples in which the apparatus 200 comprises multiple master devices, all master devices share the L3 cache 235. In other examples, each master device has its own L3 cache. As described below, the L3 cache 235 acts in an analogous fashion to the data collator 130 described above in FIG. 1.

A flow of operations performed by the apparatus 200, in order to service a data read request, will now be described.

The master device 210 transmits a read request to the slave interface 220 of the interconnect 205. The read request identifies a number of data blocks on which data processing operations of the master device 210 are to be conducted. The master device 210 requires the data blocks to be provided in a defined order. For example, where the requested data corresponds to a cache line, the master device 210 may require that the data blocks are received in their order within the cache line.

Responsive to receiving the read request, the slave interface 220 allocates sufficient buffer space in the data buffer 230 for buffering the requested data. The slave interface 220 also passes the read request on to the L3 cache 235.

The L3 cache 235 determines whether any of the requested data blocks are currently cached. If any blocks are not currently cached, the L3 cache 235 transmits a request for the un-cached blocks to the master interface 225, which forwards the request to the memory 215. The un-cached blocks are then provided from the memory 215, via the master interface 225, to the L3 cache 235.

The L3 cache 235 provides the requested data to the data buffer 230 of the slave interface 220, and may or may not also cache the data within the L3 cache, depending on implementation (for example whether the L3 cache is operating in an exclusive or inclusive manner with regard to the L1/L2 caches). The data is ordered within the buffer so that it can be provided to the master device 210 in the correct order, regardless of the order in which it is received at the buffer 230. For example, in some examples the data may be transmitted from the L3 cache 235, or from the master interface 225, out of order. In other examples, the data may be transmitted from the L3 cache 235 and/or the master interface 225 in order, but the interconnect between the L3 cache 235 and the slave interface 220 may not keep the transmissions in order. The data is then provided from the buffer 230 to the master device 210. In some examples, in order to allow the master device 210 to associate the received data with the original read request, a request ID may be provided with the initial read request. This ID is then returned with the requested data, so that the slave interface 220 and the master device 210 can associate the data with the original request.

In some examples, data which is received at the slave interface 220 in the correct order (for example, if the first block received at the slave interface 220 happens to be the first block that is required by the master device 210) can bypass the data buffer 230 and be provided directly to the master device 210.

Once all of the requested data has been provided to the master device 210, the buffer space is de-allocated. The buffer space is therefore allocated from the time at which the read request is received at the slave interface 220 to the time at which all the requested data has been provided to the master device 210. This can be a relatively long time, especially if some or all of the data is not cached by the L3 cache 235 and must be retrieved from the memory 215. This potentially lengthy allocation of buffer space can limit the number of read requests that can be serviced at any given time, as servicing of a further read request will be delayed if the number of entries within the buffer 230 that have already been allocated is such that there are insufficient free entries to be allocated for that further request.

Figure 3:
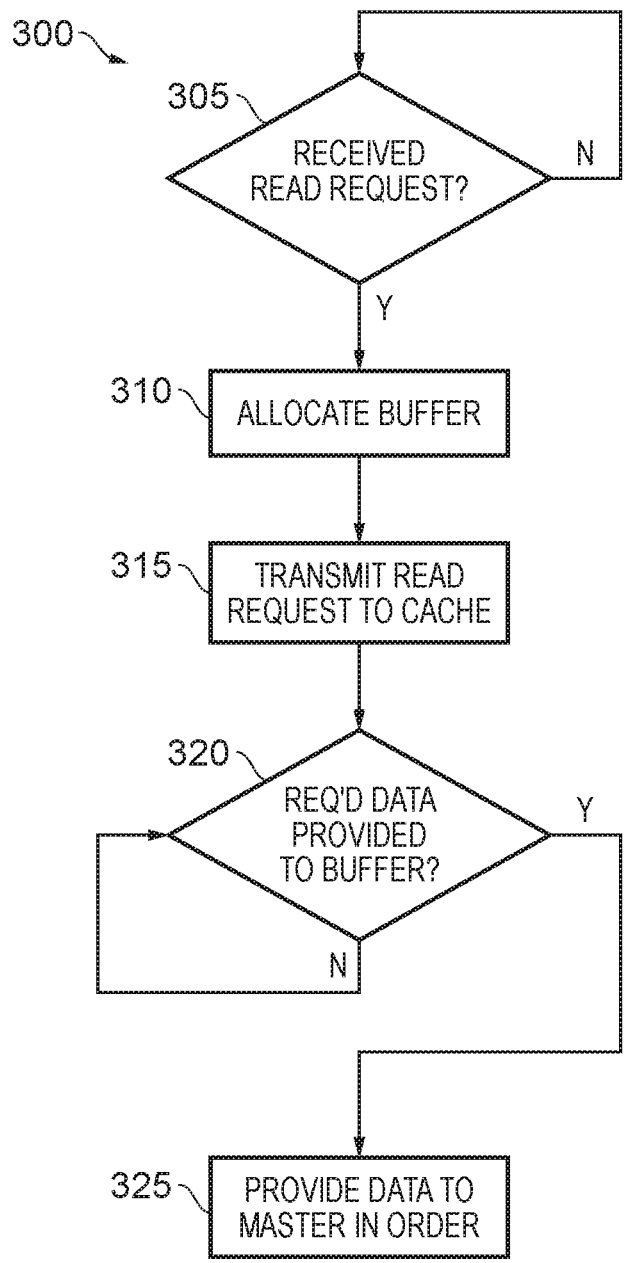
FIG. 3 is a flow diagram illustrating a method for servicing a read request in the comparative apparatus of FIG. 2.

FIG. 3 is a flow diagram illustrating a method 300 for servicing a read request in the comparative apparatus 200 of FIG. 2. The method is implemented in the slave interface 220 of the apparatus 200.

At block 305, a read request is awaited. When a read request is received from a master device 210, flow proceeds to block 310.

At block 310, buffer space in a data buffer 230 is allocated for buffering the requested data prior to providing it to the master device 210.

At block 315, the read request is transmitted to an L3 cache 235.

At block 320, the interface 220 waits until all the requested data has been buffered. As noted above, this can take a relatively long time, in particular if some of the data is not cached and must be fetched from memory 215.

When all the data is buffered, flow proceeds to block 325 where the requested data is provided to the master device in the correct order.

Figure 4:
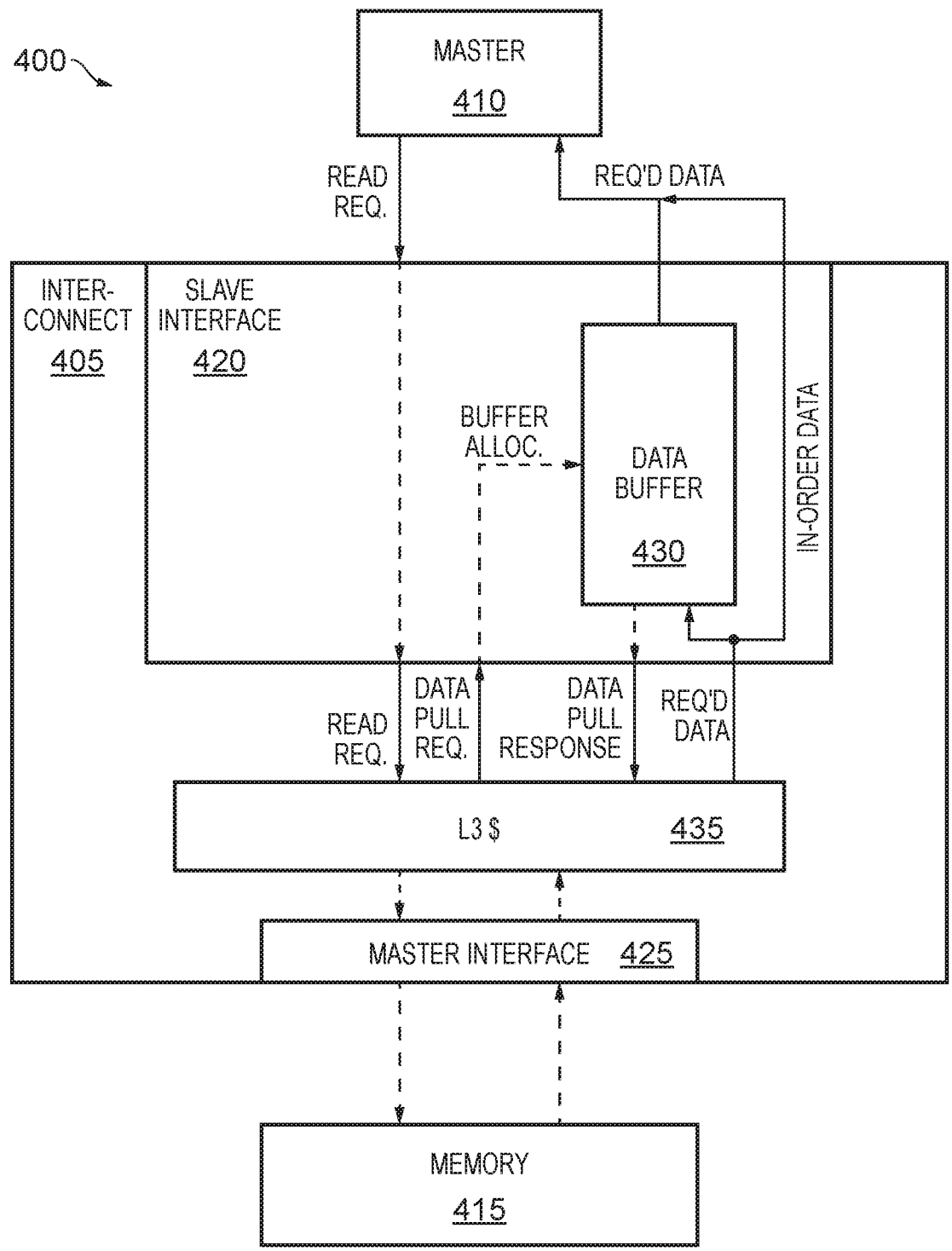
FIG. 4 schematically illustrates an apparatus according to an example of the present disclosure.

FIG. 4 schematically illustrates an apparatus 400 according to an example of the present disclosure.

The apparatus 400 comprises an interconnect 405 connecting a master device 410 and a memory 415. The master device 410 and memory 415 operate in the same manner as the master device 210 and memory 215 of apparatus 200 described above with reference to FIG. 2.

The interconnect 405 comprises a slave interface 420 coupled to the master device 410, the functionality of which is described in more detail below. The interconnect also comprises a master interface 425 coupled to the memory 415; the master interface 425 operates in the same manner as the master interface 225 of apparatus 200.

The interconnect further comprises an L3 cache 435, which operates in the same manner as the previously-described L3 cache of apparatus 200.

A flow of operations performed by the apparatus 400, in order to service a data read request, will now be described.

It will be appreciated that there are functional differences between this flow and the flow described above with reference to FIG. 2.

The master device 410 transmits a read request to the slave interface 420 of the interconnect 405. The read request identifies a number of requested data blocks, in the same manner as the request of FIG. 2. The master device 410 requires the data blocks to be provided in a defined order.

The slave interface 420 forwards the read request to the L3 cache 435. Unlike the apparatus 200 of FIG. 2, no buffer space is allocated at this time.

As with the L3 cache 235 of apparatus 200, the L3 cache determines whether any of the requested data blocks are currently cached. If any blocks are not currently cached, the L3 cache 435 transmits a request for the un-cached blocks to the master interface 425, which forwards the request to the memory 415. The un-cached blocks are then provided from the memory 415, via the master interface 425, to the L3 cache 435.

When at least some of the requested data is available in the L3 cache 435, a data pull request is transmitted to the slave interface 420. Responsive to receiving this, the slave interface 420 allocates buffer space in the data buffer 430 for buffering the requested data, and transmits a data pull response to the L3 cache 435 to indicate that the buffer space has been allocated.

In examples, different approaches may be implemented to match requested data with given allocated buffer space. In one such approach, the data pull request may not include an ID associated with the original read request (such an ID being described above in relation to FIG. 2), and the buffer space allocated in response to the data pull request is not assigned to a particular request until the data is received. In another such approach, the data pull request includes an ID associated with the original read request, so that it can be matched with that read request. The data pull response may then return a second ID, identifying the particular buffer space that was allocated. The data can then be provided to the buffer with the second ID (instead of, or in addition to, the ID of the original read request), thereby allowing the received data to be matched to the allocated buffer space.

When the buffer space is allocated, the L3 cache 435 can provide the requested data to the data buffer 430. In an example, the data pull request is transmitted as soon as some of the requested data is available in the L3 cache 435. In this example, data blocks can be provided from the L3 cache 435 to the slave interface 420 as and when they are available (once the buffer space has been allocated), thereby minimising the time required for providing all the data blocks to the slave interface. Alternatively, transmission of the data pull request may be delayed until all the requested data is available in the L3 cache 435. This can increase the time required to provide all the data blocks to the slave interface 420 and thence to the master device 410, but also minimises the time for which the buffer space is allocated.

As for the apparatus 200 of FIG. 2, the data is ordered in the buffer 430 so that it can be provided to the master device 410 in the correct order, regardless of the order in which it is received at the buffer 430. The data is then provided from the buffer 430 to the master device 410.

In some examples, data which is received at the slave interface 420 in the correct order (for example, if the first block received at the slave interface 420 happens to be the first block that is required by the master device 410) can bypass the data buffer 430 and be provided directly to the master device 410.

Once all of the requested data has been provided to the master device 410, the buffer space is de-allocated. The buffer space is therefore allocated from the time at which the data pull request is received at the slave interface 420 to the time at which all the requested data has been provided to the master device 410. The buffer space is thus allocated for a shorter time than the buffer space of apparatus 200. For example, allocation of the buffer space can be delayed until after any un-cached data has been retrieved from the memory 415. As explained above, this can be a relatively long time, and thus the reduction in the time for which buffer space is allocated can be especially large in cases in which requested data is not cached and must be fetched from memory 415.

Figure 5:
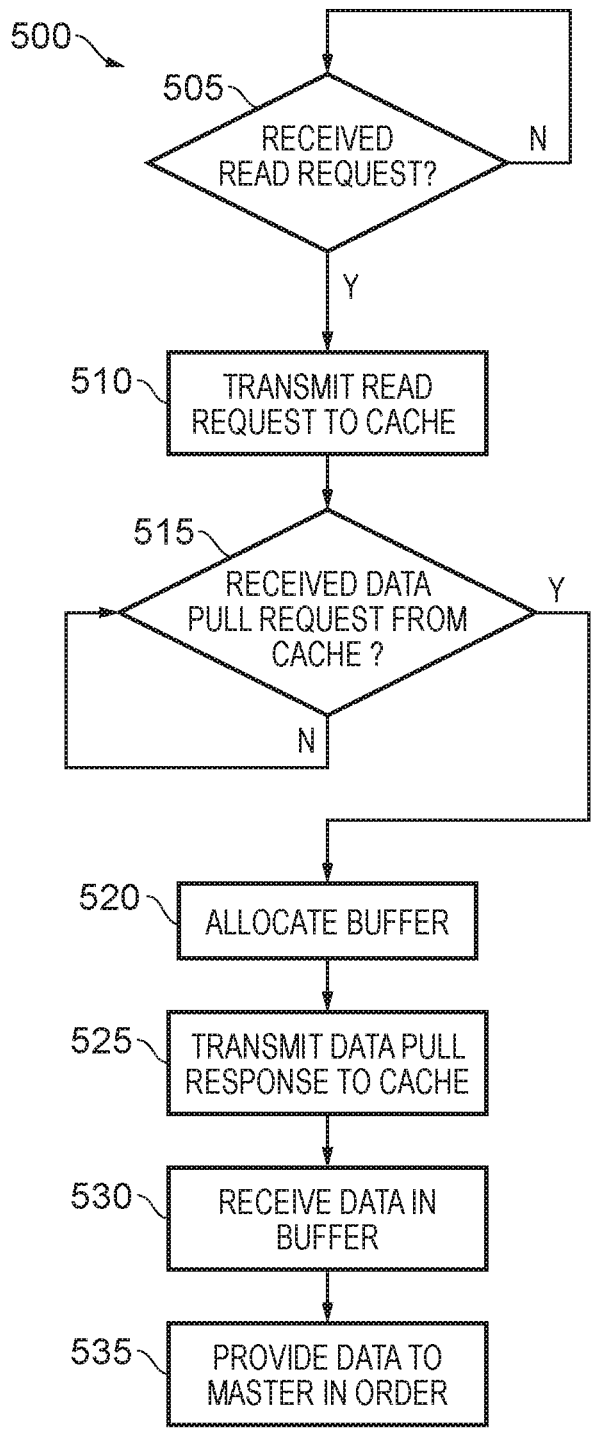
FIG. 5 is a flow diagram illustrating a method for servicing a read request in the apparatus of FIG. 4.

FIG. 5 is a flow diagram illustrating a method 500 for servicing a read request in the apparatus 400 of FIG. 4. The method is implemented in the slave interface 420 of the apparatus 400.

At block 505, a read request is awaited. When a read request is received from a master device 410, flow proceeds to block 510.

At block 510, the read request is transmitted to an L3 cache 435.

At block 515, the interface 420 waits until a data pull request is received from the L3 cache 435. As described above, this may be sent when the requested data is available in the L3 cache 435.

When the data pull request is received, flow proceeds to block 520 where buffer space is allocated for the requested data in data buffer 430. The allocation may be delayed, for example if insufficient buffer space is available.

At block 525, a data pull response is transmitted to the L3 cache 435 to indicate that the buffer space has been allocated.

At block 530, the requested data is received in the buffer 430 from the L3 cache 435.

Finally, at block 535 the data is provided to the master device 410 in the correct order. For example, the data may be ordered in the buffer 430 as it is received, prior to transmission to the master device 410.

As explained above, the apparatus 400 provides for a reduction in the amount of time for which buffer space is allocated whilst servicing a read request. An increased number of read requests can thereby be serviced with a given size of buffer 430, increasing the overall bandwidth of data flow between the memory 415 and the master device 410. However, in order to provide this reduction, two additional messages (i.e. the data pull request and data pull response) are transmitted within the apparatus 400 which are not transmitted within the system 200. The latency associated with servicing a read request in the apparatus 400 is thus a certain amount higher than the latency associated with servicing a read request in the comparative apparatus 200.

An apparatus according to examples of the present disclosure may be configured to switch adaptively between a first operation mode, in which it operates in the manner of the apparatus 200 (implementing the method 300), and a second operation mode, in which it operates in the manner of the apparatus 400 (implementing the method 500). The apparatus can thus dynamically switch between optimising for bandwidth and optimising for latency, depending on operating conditions.

Figure 6:
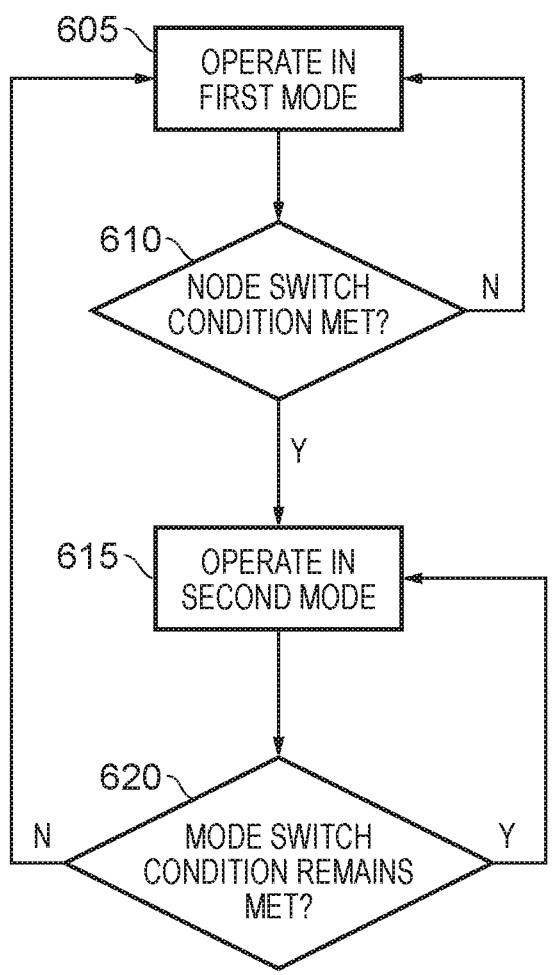
FIG. 6 is a flow diagram illustrating a method for switching between a first mode of operation and a second mode of operation that may be employed in some example implementations.

FIG. 6 is a flow diagram illustrating a method 600 for such switching between a first mode of operation and a second mode of operation.

At block 605, the apparatus is operating in the first mode (i.e. implementing method 300 in the manner of apparatus 200).

At block 610, it is determined whether a mode switch condition has been met. If the mode switch condition is not met, flow returns to block 605 and the apparatus continues operating in the first mode. If the mode switch condition is met, flow proceeds to block 615.

At block 615, the apparatus switches to operating in the second mode (i.e. implementing method 500 in the manner of apparatus 400).

At block 620, it is determined whether the mode switch condition remains met. If the condition remains met, flow returns to block 615 and the apparatus continues operating in the second mode. If the mode switch condition is no longer met, flow returns to block 605 and the apparatus switches back to operating in the first mode.

The apparatus can thus adaptively switch between the first mode and the second mode, depending on whether a mode switch condition is met. An example of such a mode switch condition is that an allocated amount of the buffer storage exceeds a threshold. This allows the lower-latency first mode to be used under conditions of low buffer occupancy, when there is little to be gained in terms of performance by minimising buffer occupancy. The higher-latency second mode can then be used when buffer occupancy becomes higher, such that the latency increase associated with the second mode becomes an acceptable trade-off for a reduction in buffer occupancy and corresponding increase in the number of read requests that can be serviced.

As another example of the mode switch condition, as mentioned earlier this may be a condition indicating that a hit rate of requested data in the cache has fallen below a threshold. If the hit rate in the cache is relatively high, the latency associated with servicing requests for data is relatively low, as a relatively large proportion of requested data can be provided directly from the cache without performing the more time-consuming process of retrieving the data from the memory. In such operating conditions, the interconnect can operate efficiently in the first mode. Conversely, if the hit rate is relatively low, the latency associated with servicing requests for data is relatively high because a relatively large proportion of data must be retrieved from memory before it can be provided to the buffer. If the first operating mode were used, given buffer space would therefore be allocated for a relatively large time. In such operating conditions, the interconnect can operate more efficiently in the second mode.

Figure 7:
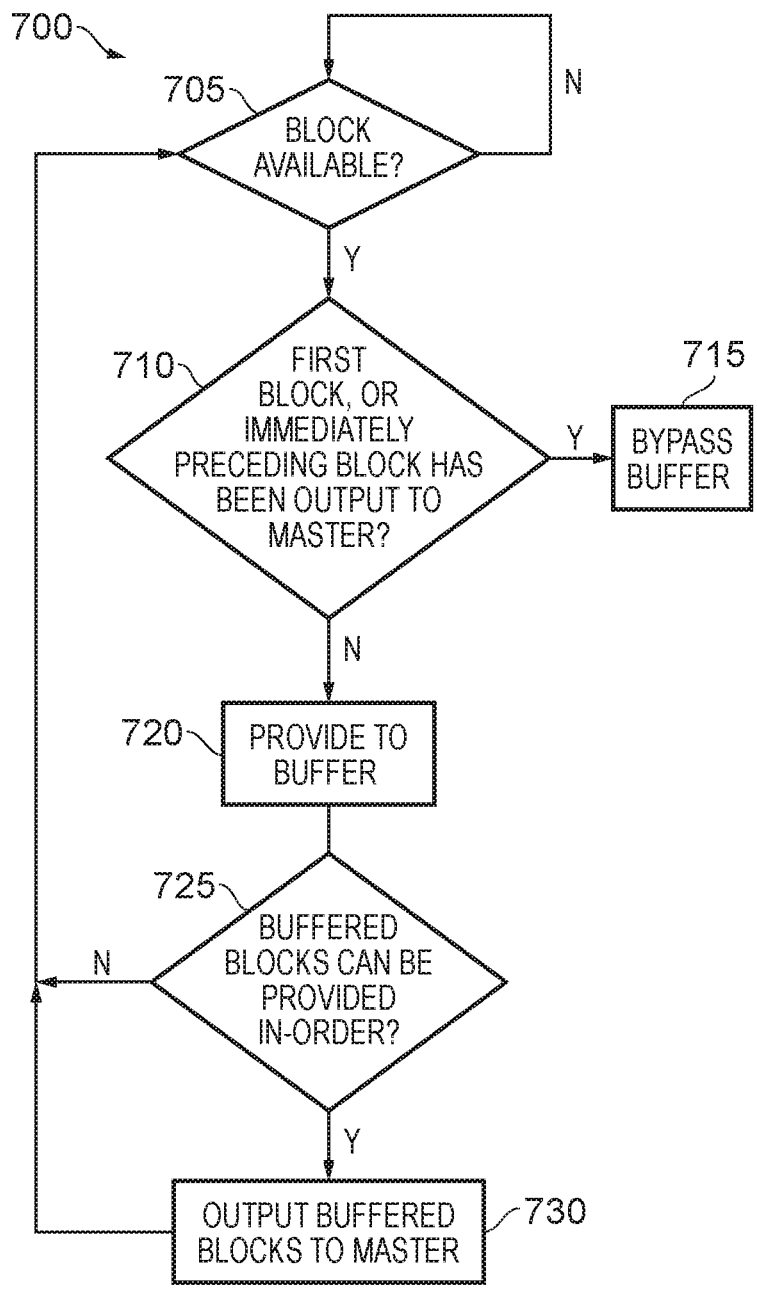
FIG. 7 is a flow diagram illustrating a method for bypassing a storage buffer that may be employed in some example implementations.

As noted above in relation to FIGS. 2 and 4, data that is already in the correct order can, in some examples, be provided directly to the master device 410 such that the buffer 230, 430 is bypassed. FIG. 7 is a flow diagram illustrating a method 700 for implementing such behaviour. The method is implemented by a slave interface 220, 420.

At block 705, the slave interface 220, 420 waits until a block is available from an L3 cache 235, 435. When a block is available, flow proceeds to block 710.

At block 710, it is determined whether the received block is the first block of the sequence of blocks that are to be output to the master device 410, or whether the immediately preceding block in the sequence has been output to the master device 410. If the result of either of these determinations is positive, it can be assumed that the present block is the next block that is required by the master device 410. Flow then proceeds to block 715, where the buffer is bypassed and the block is output directly to the master device 410.

Alternatively, if the result of both of the aforementioned determinations is negative, it can be assumed that the present block is not the next block that is required by the master device 410. Flow then proceeds to block 720, where the present block is provided to the buffer 230, 430.

At block 725, it is determined whether any buffered blocks can be provided to the master device 410 in-order. For example, even if not all of the requested blocks have been received from the L3 cache 235, 435, if the next block or blocks that are required by the master device 410 are in the buffer 230, 430 then those blocks can be provided in-order to the master device 410.

If no presently buffered blocks can be provided to the master device 410 in order, then flow returns to block 705 and the method restarts.

If at least one presently buffered block can be provided to the master device 410 in order, then flow proceeds to block 730 where said at least one block is output to the master device in order. Flow then returns to block 705 and the method restarts.

Apparatuses and methods are thus provided for servicing data read requests from a master device. From the above description it will be seen that the techniques described herein provides a number of significant benefits. In particular, the number of read requests that can be simultaneously serviced with a buffer of a given size is increased. System performance, and in particular the bandwidth available for memory accesses from a master device, can thus be improved.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:

1. An interconnect comprising:
an interface to couple a master device to the interconnect, the interface comprising buffer storage, wherein the interface is configured to receive, from the master device, a request for data comprising a plurality of data blocks, the master device requiring the data blocks of the plurality to be provided in a defined order; and
a data collator configured, at least for one operation mode of the interconnect, to:
receive the request from the interface;
issue a data pull request to the interface, to cause the interface to allocate buffer space in the buffer storage for buffering the requested data; and
responsive to receiving a confirmation from the interface that the buffer space is allocated, provide the requested data to the buffer storage,
the interface being configured to:
employ the buffer storage to enable re-ordering of the plurality of data blocks of the requested data as received by the interface, prior to outputting the plurality of data blocks to the master device; and
output the plurality of data blocks to the master device in the defined order.

2. An interconnect according to claim 1, wherein the data collator is a cache to store copies of data items from a memory.

3. An interconnect according to claim 2, wherein the cache is configured to, responsive to a lack of a stored copy of at least part of the requested data, retrieve said at least part from the memory.

4. An interconnect according to claim 2, wherein the cache is configured to issue the data pull request responsive to determining a presence of a stored copy of at least part of the requested data.

5. An interconnect according to claim 2, wherein the cache is configured to issue the data pull request responsive to determining a presence of a stored copy of all of the requested data.

6. An interconnect according to claim 1, wherein the requested data comprises data to store in a cache line of a cache of the master device.

7. An interconnect according to claim 6, wherein the defined order is such that the data blocks are output to the master device in an order corresponding to their order within the cache line.

8. An interconnect according to claim 1, configured to switch from a first operation mode, of the at least one operation mode, in which the interface is configured to allocate the buffer space responsive to receiving the request, to a second operation mode, of the at least one operation mode, in which the interface is configured to allocate the buffer space responsive to receiving the data pull request.

9. An interconnect according to claim 8, wherein the switching from the first operation mode to the second operation mode is responsive to a mode switch condition being met.

10. An interconnect according to claim 9, wherein the mode switch condition is that an allocated amount of the buffer storage exceeds a threshold.

11. An interconnect according to claim 9, wherein:
the data collator is a cache to store copies of data items from a memory; and
the mode switch condition is that a hit rate of requested data in the cache has fallen below a threshold.

12. An interconnect according to claim 9, configured to switch from the second operation mode to the first operation mode responsive to a determination that the mode switch condition is not met.

13. An interconnect according to claim 1, wherein the interface is configured to:
determine when at least one of the plurality of data blocks as received by the interface is already in the defined order; and
bypass the buffer to output said at least one of the plurality of data blocks to the master device.

14. An interconnect according to claim 13, wherein the interface is configured to provide data blocks, other than said at least one of the plurality of data blocks, to the buffer storage to enable said re-ordering.

15. An interconnect according to claim 1, comprising a further interface to couple a further master device to the interconnect, the data collator being configured to service requests from the further master device.

16. A method comprising:
receiving, from a master device, a request for data comprising a plurality of data blocks, the master device requiring the data blocks of the plurality to be provided in a defined order;
transmitting the request to a data collator;
receiving, from the data collator, a data pull request;
responsive to the data pull request, allocating buffer space in a buffer storage for buffering the requested data;
issuing to the data collator a confirmation that the buffer space is allocated;
receiving, from the data collator, the requested data, and buffering the requested data in the buffer storage, to enable re-ordering of the plurality of data blocks of the requested data as received by the interface; and
outputting the plurality of data blocks to the master device in the defined order.

17. An interconnect comprising:
interface means to couple master device means to the interconnect, the interface means comprising buffer storage means, wherein the interface means is configured to receive, from the master device means, a request for data comprising a plurality of data blocks, the master device means requiring the data blocks of the plurality to be provided in a defined order; and
data collator means configured, at least for one operation mode of the interconnect, to:
receive the request from the interface means;
issue a data pull request to the interface means, to cause the interface means to allocate buffer space in the buffer storage means for buffering the requested data; and
responsive to receiving a confirmation from the interface that the buffer space is allocated, provide the requested data to the buffer storage means,
the interface means being configured to:
employ the buffer storage means to enable re-ordering of the plurality of data blocks of the requested data as received by the interface means, prior to outputting the plurality of data blocks to the master device means; and
output the plurality of data blocks to the master device means in the defined order.

* * * * *